J. TRAU.
PROCESS OF PRODUCING POLYCHROME PHOTOGRAVURES AND APPARATUS THEREFOR.
APPLICATION FILED DEC. 27, 1912.
1,069,830. Patented Aug. 12, 1913.
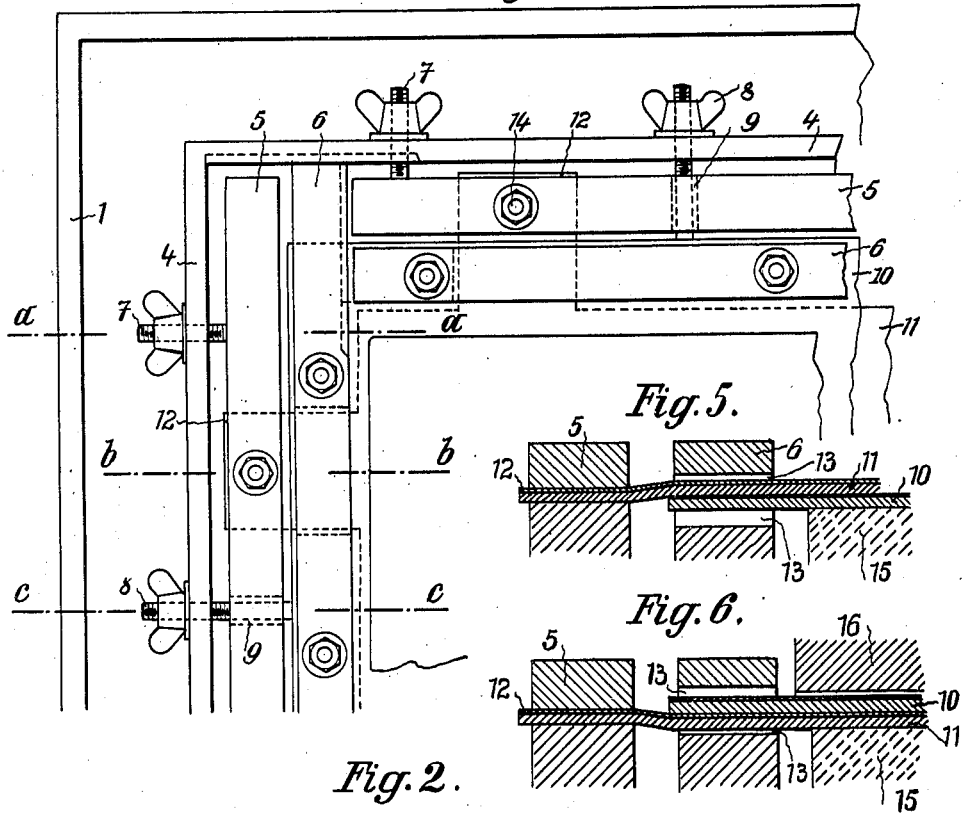
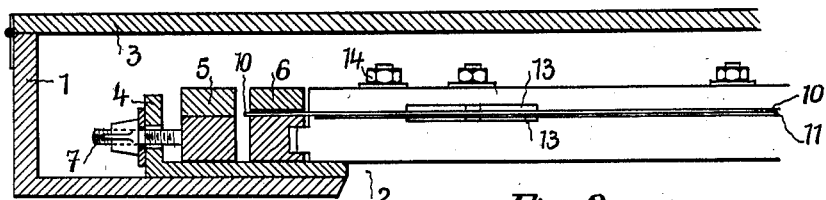
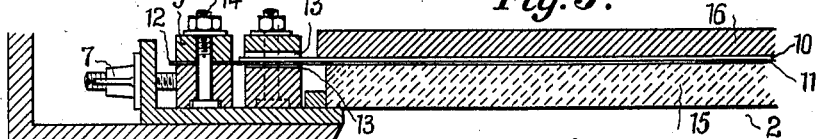

UNITED STATES PATENT OFFICE.

JOHANNES TRAU, OF DRESDEN, GERMANY.

PROCESS OF PRODUCING POLYCHROME PHOTOGRAVURES AND APPARATUS THEREFOR.

1,069,830.  Specification of Letters Patent.  Patented Aug. 12, 1913.

Application filed December 27, 1912. Serial No. 738,929.

*To all whom it may concern:*

Be it known that I, JOHANNES TRAU, a citizen of the German Empire, and residing at Dresden, Germany, have invented a certain new and useful Improved Process of Producing Polychrome Photogravures and Apparatus Therefor, of which the following is a specification.

The subject-matter of my invention is a process for producing polychrome photogravures by using subjective selection of colors, and particularly for producing a plurality of individual pictures on one large printing sheet, and also apparatus for carrying the process into practice.

In my improved process the desired individual colors are selected, in known manner, by negative-retouching from one negative by means of any desired number of films of thin material, and then individually copied together with the negative on a separate printing plate. The film side of the negative is placed against the film side of the printing plate, and the retouched surface of the covering film is placed on the back of the thin negative. Both the individual negative films, carrying the picture film proper, and also the plate or film, on which the negative films are assembled, and the retouching films consist of materials which do not stretch in the presence of moisture, e. g. celluloid, collodion or the like. By means of this process it is possible to make sharp colored photogravures from only one negative, neither three-color photography nor the production of several negatives being necessary. Further, my improved process enables a large number of individual pictures to be made simultaneously on one sheet without some of these pictures being ill defined. This is primarily due to the fact that, according to my invention, the retouching films of celluloid or the like are placed on the film side of the negative and are mounted together and held with the negative when producing the negative retouches, while during the conjoint copying of the individual retouching films and the negative on the individual printing plates, the retouching film is placed with its retouched surface on the rear of the very thin negative film, the film side of the negative lying on the film side of the printing plate. The negative and retouching films are caused to register exactly by the frame which is also used during the retouching. The negative and also the retouching film can be stretched or adjusted alone, whereby again a quite exact fit is obtained.

The great advantages which arise owing to the employment of only one negative, from which all the individual colors are selected by means of retouching films, without ill defined pictures being produced during the photogravure process, are sufficiently well known, so that they need not be enumerated. By means of the hereindescribed process not only can several separate pictures of postcard size be made with one negative, but, as is otherwise customary in the photogravure process, an entire sheet having as many as thirty-six separate post-cards.

The apparatus for carrying my process into practice substantially consists of two frames arranged one in the other and comprising two-part clamping rims, of which frames the inner serves for holding and stretching the negative, while the outer is employed for holding the retouching films. Both the frames must have a device which admits of the retouching films being placed on the two sides of the mounted negative and also admits of the retouching films being exactly adjusted relatively to the negative, it being immaterial whether they lie on the film side of the negative or on the rear.

One form of such an apparatus is represented by way of example in the accompanying drawing, wherein:—

Figure 1 is a plan view showing a corner of such an apparatus; Fig. 2 is a section taken on the line a—a, Fig. 3 is a section taken on the line b—b, and Fig. 4 is a section taken on the line c—c in Fig. 1; Figs. 5 and 6 diagrammatically show the relative positions of the individual members when retouching and when copying, respectively.

Referring to the drawing, the apparatus comprises a box or case 1 whose front wall possesses a suitable opening 2 corresponding in size to that of the surface to be exposed, while its rear wall 3 serves for closing the copying-case light-tight. Angular strips 4 are mounted in this case and serve for guiding two parallel two-part, displaceable clamping strips 5 and 6. Mounted on these two clamping strips are clamping screws 7 and 8, of which the latter, attached to the strips 6, pass through suitably large holes 9 in the strips 5. The inner strips 6 are used for holding the negative 10, while the outer strips 5 serve for holding the retouching films. For this purpose lugs 12 are provided on the retouching films; these lugs extend through recesses 13 in the inner clamping strips 6 and are led to the outer clamping strips 5.

The recesses 13 are provided in the upper and also in the lower part of the strip 6, so that it is possible to pass the lugs 12 below the firmly held negative 10 and also above the same through the openings formed by the recesses 13 to the clamping strips 5. The individual strips can be pressed together by means of screws 14, for which suitable holes will be provided in the negative and in the lugs 12 of the retouching films. The thick copying glass 15 is held in addition in the case 1, and also means, not shown, are provided for pressing the printing plate 16 firmly against the negative and securing it in its correct position. Wedges, springs and other means generally used in copying frames are used for this purpose.

My improved process is carried into practice by means of the above-described apparatus as follows: The individual negatives of a large number of separate exposures are transferred to a thin sheet of celluloid in known manner by dissolving the negative film from the negative and transferring the same to the celluloid-foil. The series negative foil obtained in this manner is now fixed in the clamping strips 6 over the glass 15 (Fig. 3) with the film side of the negative 10 top. By tightening the screws 8 the negative is now stretched smooth and then a retouching foil 11 is placed on the negative and its lugs 12 led through the recesses 13 of the top part of the strips 6 to the outer clamping strips 5. By tightening the screws 7 this superposed retouching film is also stretched smooth, as shown in Fig. 5. When this has been done the retoucher begins his work and by retouching in full and half tones selects that color which is desired. When the film 11 is retouched, i. e. when all the separate small pictures of the negative have been suitably treated on the retouching film, the film 11 is released from the clamping strips 5 and removed from the negative foil. The retoucher now proceeds in like manner with the various other colors. When all the colors have been treated in this manner the printing plates are copied, as many being copied as retouching films have been made.

The copying itself is done as follows: One of the retouching films is placed under the negative foil still held stretched by the clamping strips 6, the retouched surface of the film being placed against the negative foil. The lugs of this retouching film are pushed through the lower recesses 13 in the lower part of the strips 6 and led to the clamping strips 5 and there secured. (Cf. Fig. 6). The retouching film is now adjusted exactly corresponding to the negative foil by tightening the screws 7.

If folds or waves have formed in the negative foil or in the retouching film these can be readily removed by adjusting the individual screws 7 and 8. The retouching film and the negative foil are exactly adjusted to one another over the entire surface. The consequence is a sharp copy. It may here be mentioned that the printing plate 16 is placed with its film side on the film side of the negative foil 10 and that this printing plate is firmly pressed against the negative by suitable means, e. g. wedges, springs or the like, and held in the position in which it is placed. As many printing plates are made in this manner as colors have been retouched out of the negative. All these printing plates printed one over another result in the polychrome photogravure.

I claim:—

1. A process of producing polychrome photogravures by means of subjective selection of colors, consisting in placing the retouching films, which are requisite for the various individual colors, on the film side of one single negative and selecting the desired colors on the retouching films, in then placing the retouching films with their film sides against the back of the negative lying with its film side against the printing plate, and in copying the same, both the negative and the retouching films consisting of a material which does not stretch in the presence of moisture.

2. A process of producing polychrome photogravures by means of subjective selection of colors, consisting in placing the retouching films, which are requisite for the various individual colors, on the film side of one single negative and selecting the desired colors on the retouching films, in then placing the retouching films with their film sides against the back of the negative lying with its film side against the printing plate, and in copying the same, both the negative and the retouching films consisting of a material which does not stretch in the presence of moisture, the negative being stretched during the entire process and the retouching films being stretched during the selecting and printing operations.

3. In copying apparatus of the character described, the combination of inner stretching means, and outer stretching means surrounding the same, the inner stretching means having openings directed toward the outer stretching means.

4. In copying apparatus of the character described, the combination with a case having an aperture in the front thereof, an inner stretching frame surrounding the aperture, an outer stretching frame surrounding the inner frame, the inner frame having openings directed toward the outer frame, and a copying glass normally held in the frame at the aperture.

In testimony whereof, I affix my signature in the presence of two witnesses.

JOHANNES TRAU.

Witnesses:
PAUL ARRAS,
CLÄRE SIMON.